(12) United States Patent
Jiang et al.

(10) Patent No.: US 10,330,973 B2
(45) Date of Patent: Jun. 25, 2019

(54) COLOR FILTER SUBSTRATE, DISPLAY PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Kun Jiang, Beijing (CN); Jian Wang, Beijing (CN); Ruichen Zhang, Beijing (CN); Wei Zhao, Beijing (CN); Na Li, Beijing (CN); Xuechao Song, Beijing (CN); Chunlei Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 167 days.

(21) Appl. No.: 15/507,359

(22) PCT Filed: Jun. 29, 2016

(86) PCT No.: PCT/CN2016/087621
§ 371 (c)(1),
(2) Date: Feb. 28, 2017

(87) PCT Pub. No.: WO2017/117927
PCT Pub. Date: Jul. 13, 2017

(65) Prior Publication Data
US 2018/0107052 A1    Apr. 19, 2018

(30) Foreign Application Priority Data
Jan. 4, 2016 (CN) .......................... 2016 1 0003762

(51) Int. Cl.
G02F 1/1335 (2006.01)
G02F 1/1339 (2006.01)

(52) U.S. Cl.
CPC ...... *G02F 1/133514* (2013.01); *G02F 1/1339* (2013.01); *G02F 1/133512* (2013.01); *G02F 2202/22* (2013.01)

(58) Field of Classification Search
CPC .................... G02F 1/133514; G02F 1/133512
See application file for complete search history.

(56) References Cited

U.S. PATENT DOCUMENTS

2004/0017526 A1    1/2004 Kuo
2008/0252831 A1   10/2008 Lee et al.
(Continued)

FOREIGN PATENT DOCUMENTS

CN    101295090 A    10/2008
CN    101393343 A     3/2009
(Continued)

OTHER PUBLICATIONS

Machine Translation of CN103926742A Oct. 2018.*
(Continued)

*Primary Examiner* — Phu Vu
(74) *Attorney, Agent, or Firm* — Banner & Witcoff, Ltd.

(57) ABSTRACT

The present disclosure relates to a color filter substrate, a display panel and a display device. The color filter substrate includes a conductive layer located at a side of the color filter substrate where a color filter is located, a peripheral region of the conductive layer is provided with an isolation band configured to isolate external static electricity, the isolation band is provided with a breach, an inside portion of the conductive layer located inside the isolation band is provided with an extending portion configured to export static electricity, and the extending portion is extending to an edge of the color filter substrate through the breach.

11 Claims, 5 Drawing Sheets

(56) References Cited

U.S. PATENT DOCUMENTS

| | | |
|---|---|---|
| 2010/0079694 A1 | 4/2010 | Yoshida et al. |
| 2014/0071384 A1* | 3/2014 | Ho .................... G02F 1/136204 |
| | | 349/106 |
| 2015/0049409 A1 | 2/2015 | Choi et al. |

FOREIGN PATENT DOCUMENTS

| | | |
|---|---|---|
| CN | 101713883 A | 5/2010 |
| CN | 102243405 A | 11/2011 |
| CN | 103926742 A | 7/2014 |
| CN | 105138188 A | 12/2015 |
| CN | 105607332 A | 5/2016 |

OTHER PUBLICATIONS

Sep. 30, 2016—(WO) International Search Report and Written Opinion Appn PCT/CN2016/087621 with English Tran.
Mar. 27, 2018—(CN) First Office Action Appn 201610003762.6 with English Tran.

* cited by examiner

COLOR FILTER SUBSTRATE, DISPLAY PANEL AND DISPLAY DEVICE

CROSS-REFERENCE TO RELATED APPLICATIONS

The application is a U.S. National Phase Entry of International Application No. PCT/CN2016/087621 filed on Jun. 29, 2016 designating the United States of America and claiming priority to Chinese Patent Application No. 201610003762.6 filed on Jan. 4, 2016. The present application claims priority to and the benefit of the above-identified applications and the above-identified applications are incorporated by reference herein in their entirety.

TECHNICAL FIELD

The present disclosure relates to technical field of display, particularly to a color filter substrate, a display panel and a display device.

BACKGROUND

ESD (short for Electrostatic Discharge) usually is rapidly occurred with extremely high intensity and breaks down a semiconductor device or generates heat energy enough to melt a semiconductor device, which may cause damage and scrap of components in the device and also huge economy loss.

During processes of manufacture, production, assembling and test of display devices, static electricity is liable to be generated on the display devices due to friction, or external static electricity in air, human body or other charged objects may be transferred to the display devices due to electrical connection. Upon the static electricity on the surface of the substrate is accumulated for long term, ESD may occur, and film layers on the substrate may be broken down so as to damage the semiconductor devices on the surface of the substrate.

In-plane switching (IPS) or advanced super dimension switch (ADS) mode liquid crystal display (LCD) panel is one of the most widely applied LCD panels. With regard to a LCD panel of in-plane switching mode, both common electrode and pixel electrode are formed on the array substrate, and there is no conductive film layer on the color filter (CF) substrate, thus it is easy for static electricity to be accumulated so as to cause electrostatic discharge and damage the display device.

In order to avoid the abovementioned problem, an ITO (indium tin oxide) thin film is generally manufactured on a backside of the CF substrate to release static electricity. However, the method in which an ITO thin film is manufactured on the backside of the CF substrate involves the problem that the ITO thin film is susceptible to mechanical damage and the like; moreover, external static electricity may enter the display device through the ITO thin film to cause static electricity accumulation.

SUMMARY

The purposes of the present disclosure are to provide a CF substrate, a display panel and a display device, so as to solve the problems that the ITO thin film is susceptible to mechanical damage and the external static electricity may enter the display device through the ITO thin film to cause static electricity accumulation and the like.

In order to achieve the abovementioned purposes, the present disclosure provides a color filter substrate, including a conductive layer located at a side of the color filter substrate where a color filter is located, a peripheral region of the conductive layer is provided with an isolation band configured to isolate external static electricity, the isolation band is provided with a breach, an inside portion of the conductive layer located inside the isolation band is provided with an extending portion configured to export static electricity, the extending portion is extending to an edge of the color filter substrate through the breach. By disposing an isolation band in the peripheral region of the conductive layer, the external static electricity can be effectively isolated so as to prevent from static electricity accumulation on the substrate. By disposing the conductive layer on a side of the color filter substrate where the color filter is located, the problem that the conductive film is susceptible to mechanical damage can be avoided.

Optionally, the isolation band is a groove disposed in the peripheral region of the conductive layer.

Optionally, the isolation band is extending from an edge of the inside portion of the conductive layer to the edge of the color filter substrate.

Optionally, the conductive layer is a black matrix having electrically conductive performance. By forming the black matrix as the conductive layer, complex manufacturing processes of an ITO thin film are avoided, which simplifies the production process, reduces the cost, prevents from problems in display due to the damage of ITO thin film, and also improves a transmittance of the display device.

Optionally, the black matrix is a black matrix doped with a conductive material. Furthermore, the conductive material is one or more selected from a group consisting of carbon black, carbon nano tube, graphite and metal powder.

Optionally, the black matrix is of a conductive polymer material which has been subjected to an optical modification treatment.

Optionally, the black matrix is of a chromium material.

Optionally, the color filter substrate further includes an insulating planarization layer disposed on the black matrix, and the insulating planarization layer includes a convex portion filled in the isolation band.

Optionally, the insulating planarization layer is of a transparent insulating resin material.

Optionally, a depth of the isolation band is not smaller than a thickness of the conductive black matrix.

Optionally, the conductive layer is of transparent indium tin oxide (ITO) material.

Optionally, the conductive layer is disposed on the black matrix, or, disposed between the first substrate and the black matrix, or, disposed on the insulating planarization layer.

Optionally, a depth of the isolation band is not smaller than a thickness of the conductive layer.

Optionally, the color filter substrate further includes an insulating planarization layer disposed on the conductive layer, and the insulating planarization layer is provided with a convex portion filled in the isolation band.

Optionally, the insulating planarization layer is of a transparent insulating resin material.

Optionally, the isolation band is filled with dry air or a transparent insulating material.

The present disclosure further provides a display panel including the abovementioned color filter substrate and an array substrate, the array substrate is provided with a grounding portion which is electrically connected to the extending portion.

Optionally, the color filter substrate and the array substrate are connected through a sealant, and an outer edge of the sealant is located at an external side of an outer edge of the inside portion of the conductive layer. By protecting the outer edge of the inside portion of the conductive layer through the sealant, the external static electricity can be prevented from entering the display device.

The present disclosure further provides a display device including the abovementioned display panel.

The present disclosure is advantageous in that, the color filter substrate includes a conductive layer and an isolation band configured to isolate external static electricity so as to prevent external static electricity entering the display device and reduce static electricity accumulation; the conductive layer is disposed inside the color filter substrate so that the conductive layer would not be subjected to mechanical damage. At the same time, a black matrix having electrically conductive performance is adopted as the conductive layer, so as to improve the transmittance of the display device, and save the processing steps. The conductive layer and the insulating isolation band are formed through a single patterning process, which simplifies the production process and reduces the cost.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein.

Figure 1:
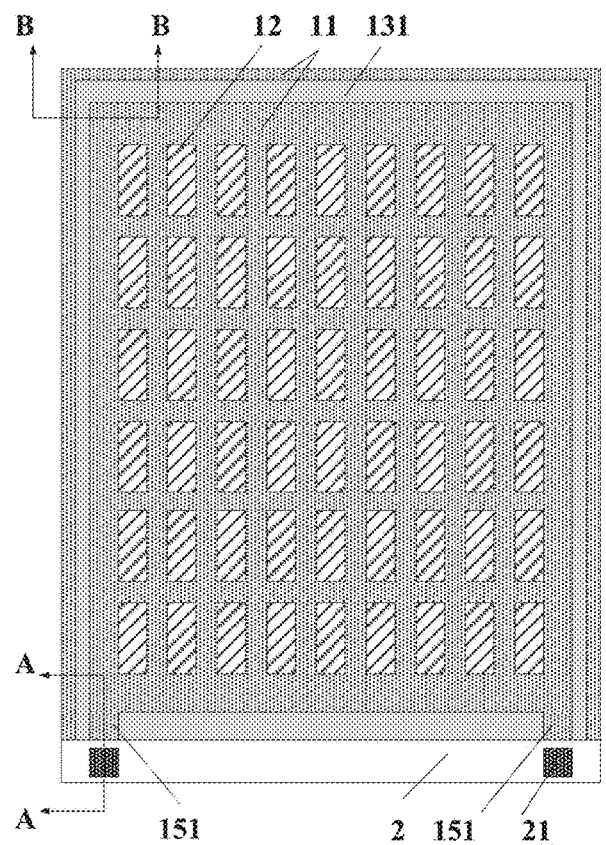
FIG. 1 is a plan view illustrating a color filter substrate and a display panel provided by some embodiments of the present disclosure.

REFERENCE NUMERALS 1-color filter substrate; 2-array substrate; 10-first substrate; 11-black matrix; 12-color filter; 131-first isolation groove; 132-first isolation band; 133-second isolation groove; 134-second isolation band; 14-insulating planarization layer; 151-first extending portion; 152-second extending portion; 153-third extending portion; 154-fourth extending portion; 16-transparent conductive layer; 21-grounding portion; 22-silver adhesive; 23-sealant.

DETAILED DESCRIPTION

In order to make one skilled person in the art better understand the technical solutions of the present disclosure, hereafter, a color filter substrate, display panel and display device of the present disclosure will be further described in detail with reference to the accompanying drawings and embodiments.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 2:
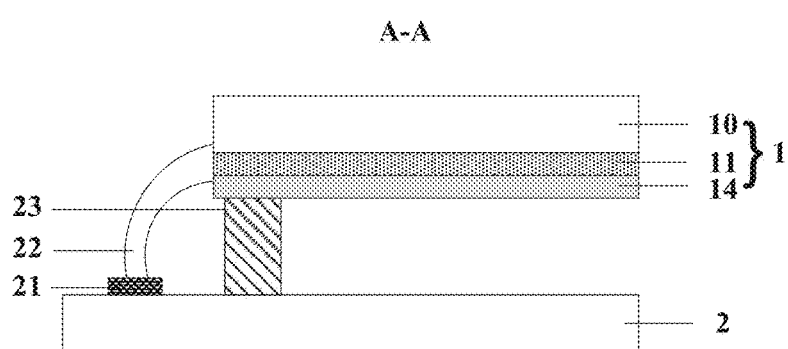
FIG. 2 is a sectional view taken along A-A direction of a color filter substrate and a display panel provided by some embodiments of the present disclosure.
Figure 3:
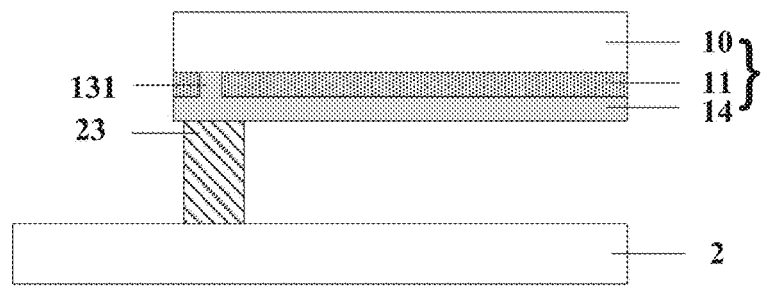
FIG. 3 is a sectional view taken along B-B direction of a color filter substrate and a display panel provided by some embodiments of the present disclosure.

Some embodiments of the present disclosure provide a color filter substrate and a display panel including the color filter substrate. FIG. 1 is a plan view illustrating a color filter substrate and display panel of the present embodiment. FIG. 2 is a sectional view taken along A-A direction of the color filter substrate and the display panel of the present embodiment. FIG. 3 is a sectional view taken along B-B direction of the color filter substrate and the display panel of the present embodiment. In the abovementioned drawings, the color filter substrate 1 includes: a conductive layer located at a side of the color filter substrate where a color filter is located; and an isolation band disposed in a peripheral region of the conductive layer, wherein the isolation band is configured to isolate external static electricity.

In the present embodiment, the conductive layer is a black matrix 11 having electrically conducive performance. As illustrated by FIGS. 1, 2 and 3, the color filter substrate 1 further includes a first substrate 10 and a color filter 12. The black matrix 11 and the color filter 12 are disposed in the same layer on the first substrate 10; the color filter 12 includes three types of color resins which are of red R, green and blue B, respectively. The isolation band is a first isolation groove 131 disposed in the peripheral region of the conductive layer in a form of black matrix, and the isolation band divides the conductive layer in a form of black matrix 11 into an inside portion and an outside portion. A depth of the first isolation groove 131 is not smaller than a thickness of the black matrix. The first isolation groove 131 is provided with a breach, the inner portion of the black matrix which is located inside the first isolation groove 131 is provided with a first extending portion 151, the first extending portion 151 is extending to an edge of the color filter substrate through the breach.

A material of the black matrix may be conductive resin. For example, a conductive resin material may be formed by doping related black matrix materials with carbon black, metal powder, graphite, carbon nano tube and other conductive materials. Such method renders low cost, wherein the doped conductive materials would not affect the performance of the black matrix material itseft but only increase the photoresist performance of the related black matrix materials, and the resulting electrically conductive performance will be excellent.

In the meanwhile, the black matrix material may be replaced by conductive polymer materials having been subjected to optical modification treatment, so as to form a conductive resin material. Such method does not introduce any dopers, and the resulting electrically conductive performance will be excellent.

Besides, metal materials such as chromium can also be adopted as the black matrix material, so as to obtain excellent conductive performance and also good light-shielding effect.

In the related art, a surface resistance of an ITO thin film on a backside of a color filter substrate is 400Ω/cm2; as a contrast, in the present, the black matrix adopts a conductive resin material (with a resistivity of 104~0.001Ω/cm2) to effectively replace the ITO thin film to play a role of exporting static electricity and preventing from eletrostatic discharge. In the meanwhile, because the conductive, black matrix material is located inside the color filter substrate, it has a capacity of exporting static electricity which is better than that of the ITO thin film at the backside, and the problem that the conductive thin film is subjected to mechanical damage can be avoided. Moreover, in the related art, it needs to coat a layer of ITO thin film, by evaporating process, on the backside of the color filter substrate, which requires complex technology and reduces the transmittance. Besides, the ITO thin film is susceptible to mechanical damage, and hence results in display problem; as a contrast, the conductive, black matrix material adopted in the present embodiment does not additionally increase processing steps, and hence reduces the costs, avoids reduction of transmittance and also display problem caused by the mechanical damage of ITO thin film. By disposing the first isolation groove 131 in the peripheral region of the black matrix and by dividing the black matrix into an inside portion and an outside portion, it can effectively prevent the external static electricity from entering the display device through the conductive black matrix at the edge of the substrate.

Optionally, the color filter substrate 1 further includes an insulating planarization layer 14 disposed on the black matrix 11. The insulating planarization layer 14 adopts a transparent insulating resin material having relatively good insulating performance, and is provided with a convex portion which is filled in the first isolation groove 131. The transparent insulating resin material located in the first isolation groove 131 allows to achieve insulating and anti-static effect in a better way, without reducing the transmittance of the screen. Besides, the first isolation groove can also be filled with dry air only so as to achieve the insulating and anti-static effect.

The present embodiment provides a display panel including a color filter substrate 1 and an array substrate 2. The array substrate 2 is provided with a grounding portion 21, the grounding portion 21 may be a grounding pin which is located at a side of the array substrate. The grounding portion 12 is electrically connected with the first extending portion 151 through, for example, a silver adhesive 22, so as to export the static electricity of the color filter substrate.

The color filter substrate 1 and the array substrate 2 are sealed and connected through a sealant 23. In order to prevent the inside portion of the conductive black matrix located inside the first isolation groove form being exposed to the outside, such exposion may result in external static electricity entering the display device through the inside conductive black matrix; for example, it's possible to dispose an outer edge of the sealant at the external side of the outer edge of the inside portion of the conductive black matrix which is located inside the first isolation groove.

The present embodiment further provides a display device including the abovementioned display panel. The display device is applicable for different kinds of display products, particularly for display products with narrow frames. The black matrix material located at the edge of the substrate can further play a role of preventing from lightleakage at the edge of the screen.

Figure 4:
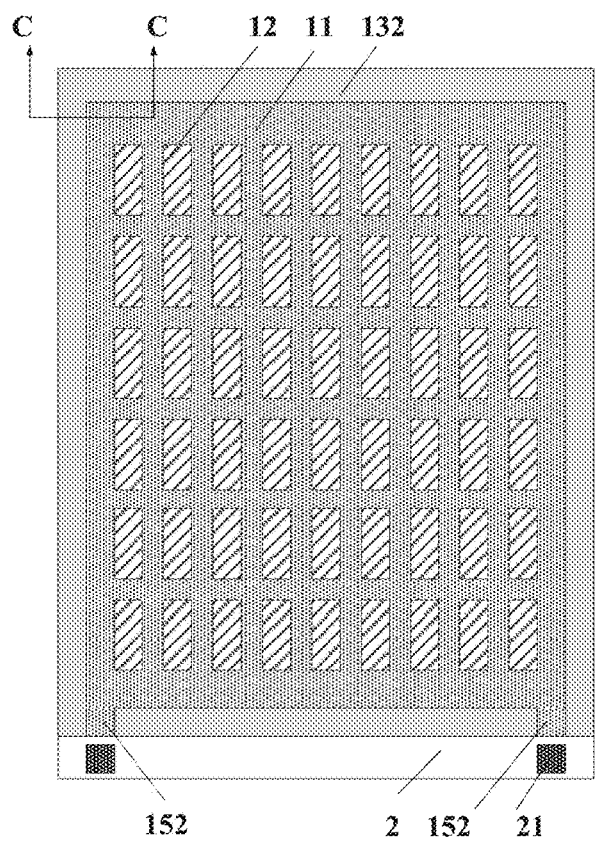
FIG. 4 is a plan view illustrating a color filter substrate and a display panel provided by some embodiments of the present disclosure.
Figure 5:
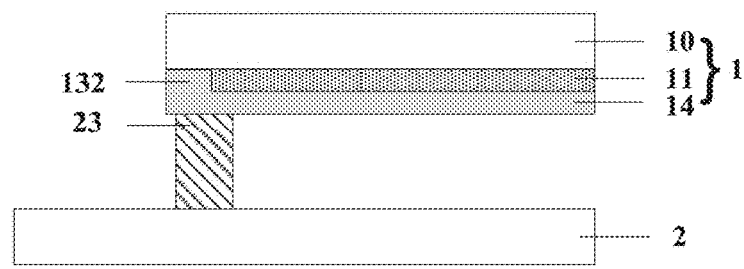
FIG. 5 is a sectional view taken along C-C direction of a color filter substrate and a display panel provided by some embodiments of the present disclosure.

The present embodiment provides a color filter substrate and a display panel which are different from the abovementioned embodiment in that, the isolation band is a first isolation band 132 extending from an edge of the conductive layer black matrix to an edge of the color filter substrate, and plays a role of blocking the external static electricity. FIG. 4 is a plan view illustrating a color filter substrate and a display panel of the present embodiment. FIG. 5 is a sectional view taken along C-C direction of the color filter substrate and the display panel of the present embodiment.

As illustrated by FIGS. 4 and 5, the color filter substrate 1 of the present embodiment includes a first substrate 10, a black matrix 11, a color filter 12 and a first isolation band 132. The black matrix 11 and the color filter 12 are disposed in the same layer on the first substrate 10; and the color filter 12 includes three types of color resins which are of red R, green G and blue B, respectively. The first isolation band 132 is disposed in the peripheral region of the conductive black matrix, and is extending from an edge of the conductive black matrix to an edge of the color filter substrate. A thickness of the first isolation band 132 is not smaller than a thickness of the conductive black matrix. The first isolation band 132 is provided with a breach, and the inside portion of the black matrix located inside the first isolation band 132 is provided with a second extending portion 152, wherein the second extending portion 152 is extending to the edge of the color filter substrate through the breach.

Optionally, the color filter substrate 1 further includes an insulating planarization layer 14 disposed on the black matrix 11. The insulating planarization layer adopts a transparent insulating resin material having relatively good insulating performance, and is provided with a convex portion filled in the first isolation band 132. The transparent insulating resin material located in the first isolation band 132 allows to achieve insulating and anti-static effect in a better way, without reducing the transmittance of the screen. Besides, the first isolation groove 132 can also be filled with dry air only, so as to achieve the insulating and anti-static effect.

Figure 6:
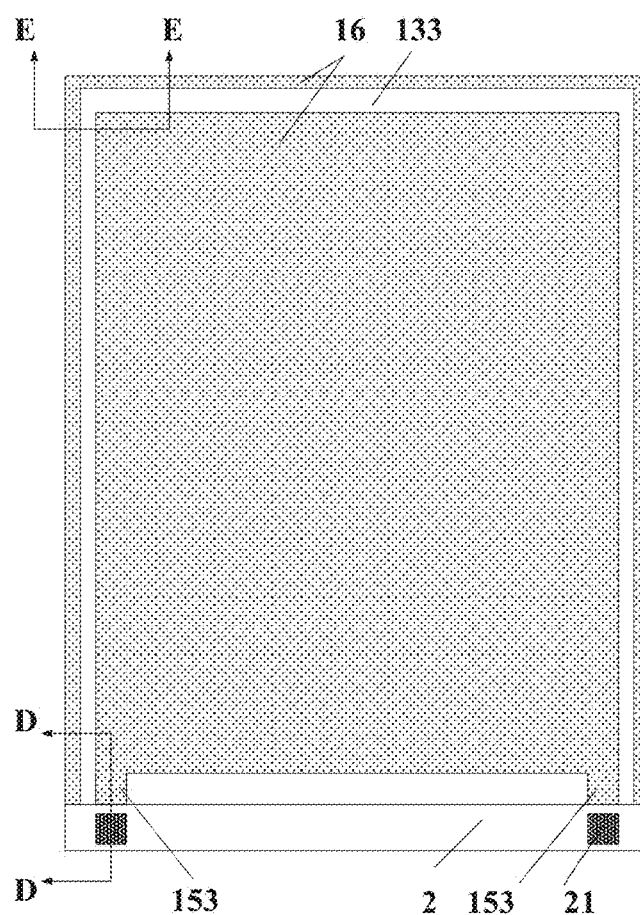
FIG. 6 is a plan view illustrating a color filter substrate and a display panel provided by some embodiments of the present disclosure.
Figure 7:
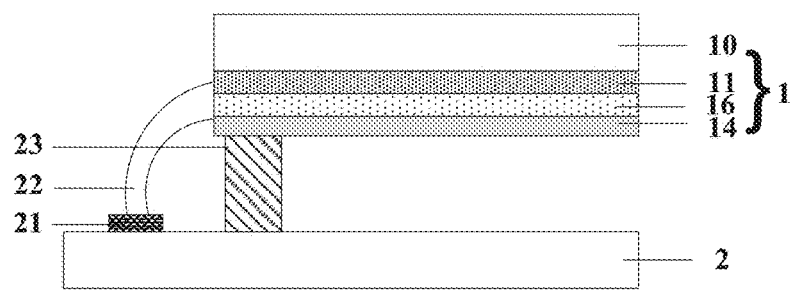
FIG. 7 is a sectional view taken along D-D direction of a color filter substrate and a display panel provided by some embodiments of the present disclosure.
Figure 8:
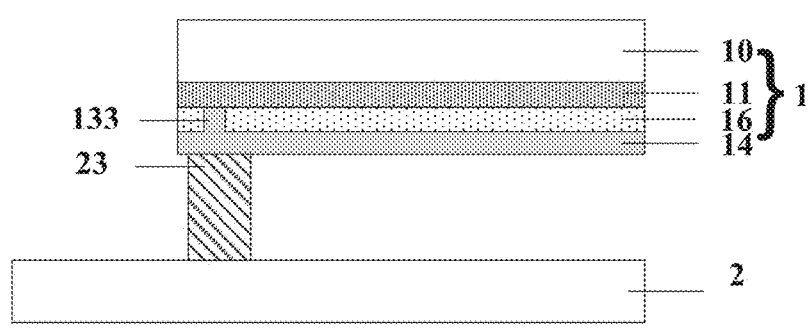
FIG. 8 is a sectional view taken along E-E direction of a color filter substrate and a display panel provided by some embodiments of the present disclosure.

The present embodiment provides a color filter substrate and a display panel, which are different from the abovementioned embodiments in that, the black matrix of the present embodiment is a conventional black matrix having no conductive performance, the conductive layer of the present embodiment is a transparent conductive layer 16 disposed at the side of the color filter substrate where the color filter is located, and the isolation band of the present embodiment is a second isolation groove 133 disposed in the peripheral region of the transparent conductive layer 16 to divide the transparent conductive layer into an inside portion and an outside portion. FIG. 6 is a plan view illustrating a color filter substrate and a display panel of the present embodiment. FIG. 7 is a sectional view taken along D-D direction of the color filter substrate and the display panel of the present embodiment. FIG. 8 is a sectional view taken along E-E direction of the color filter substrate and the display panel of the present embodiment.

As illustrated by FIGS. 6, 7 and 8, the color filter substrate 1 of the present embodiment includes a first substrate 10, a black matrix 11, a color filter 12 (not illustrated), a transparent conductive layer 16 and a second isolation groove 133. The black matrix 11 and the color filter 12 are disposed in the same layer on the first substrate 10, and the color filter 12 includes three types of color regions of red R, green G and blue B, respectively. The transparent conductive layer 16 is disposed on the black matrix. A depth of the second isolation groove 133 is not smaller than a thickness of the transparent conductive layer 16. The second isolation groove 133 is provided with a breach, and the inside portion of the transparent conductive layer located inside the second isolation groove 133 is provided with a third extending portion 153, wherein the third extending portion 153 is extending to an edge of the color filter substrate through the breach.

Furthermore, a material of the transparent conductive layer may be transparent ITO thin film. The second isolation groove 133 disposed in the peripheral region of the transparent conductive layer divides the transparent conductive layer into an inside portion and an outside portion, which effectively prevents external static electricity from entering the display device through the conductive transparent conductive layer at the edge of the substrate.

Furthermore, the color filter substrate 1 further includes an insulating planarization layer 14 disposed on the transparent conductive layer 16. The insulating planarization layer adopts a transparent insulating resin material with relatively good insulating performance, and is provided with a convex portion filled in the second isolation groove 133. The transparent insulating rein material located in the second isolation groove 133 allows to achieve insulating and anti-static effect in a better way, without reducing the transmittance of the screen. Besides, the second isolation groove 133 can also be filled with dry air only, so as to achieve the insulating and anti-static effect.

Besides, a location of the transparent conductive layer 16 is not limited to be between the black matrix 11 and the insulating planarization layer 14, but may also be between the first substrate 10 and the black matrix 11, or be on the insulating planarization layer 14. The second isolation groove 133 can also be filled with dry air or transparent insulating material, so as to achieve the insulating and anti-static effect.

The display panel of the present embodiment further includes an array substrate 2, and the array substrate is provided with a grounding portion 21, wherein the grouding portion can be a grounding pin which is located at a side of the array substrate. As illustrated by FIG. 7, the grounding portion 21 is electrically connected with a third extending portion 153 through, for example, a silver adhesive 22, so as to export the static electricity of the color filter substrate.

As illustrated by FIGS. 7 and 8, the color fitler substrate 1 and the array substrate 2 are sealed and connected through a sealant. An outer edge of the sealant is disposed outside the outer edge of the inside portion of the transparent conductive layer located inside the second isolation groove, so as to prevent external static electricity from entering the display device.

The present embodiment further provides a display device including the abovementioned display panel.

Figure 9:
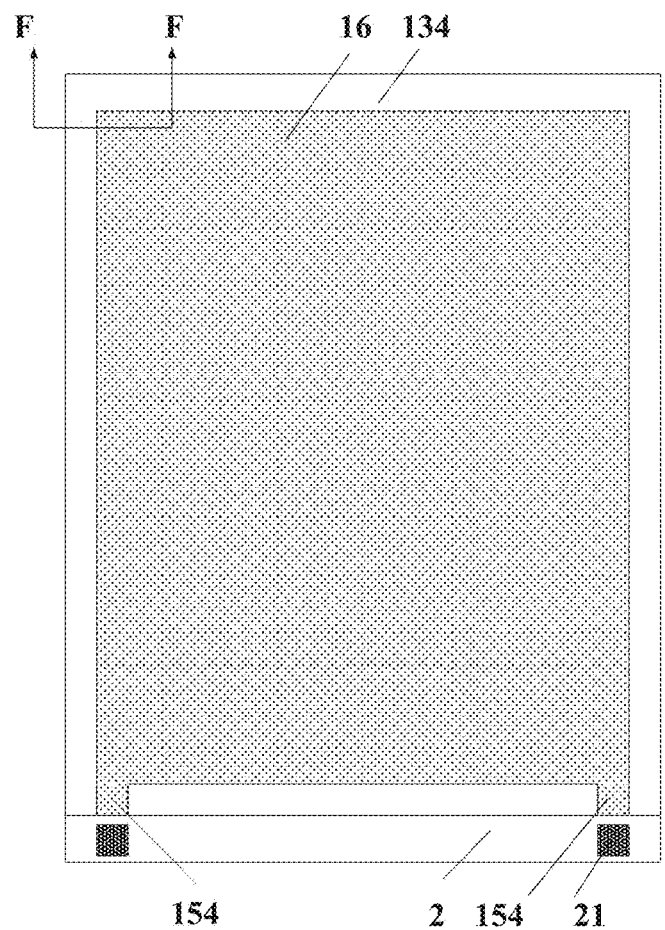
FIG. 9 is a plan view illustrating a color filter substrate and a display panel provided by some embodiments of the present disclosure.
Figure 10:
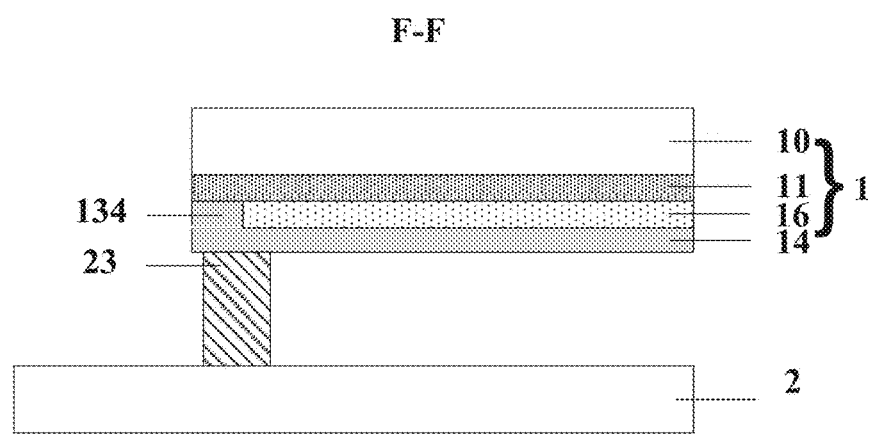
FIG. 10 is a sectional view taken along F-F direction of a color filter substrate and a display panel provided by some embodiments of the present disclosure.

The present embodiment provides a color fitler substrate and a display panel, which are different from the abovementioned embodiments in that, the isolation band of the present embodiment is a second isolation band 134 extending from an edge of the transparent conductive layer 16 to an edge of the color filter substrate to paly a role of blocking the external static electricity. FIG. 9 is a plan view illustrating a color filter substrate and a display panel of the present embodiment. FIG. 10 is a sectional view taken along F-F direction of the color filter substrate and the display panel of the present embodiment.

As illustrated by FIGS. 9 and 10, the color filter substrate 1 of the present embodiment includes a first substrate 10, a black matrix 11, a color filter 12 (not illustrated), a transparent conductive layer 16, and a second isolation band 134. The black matrix 11 and the color filter 12 are disposed in the same layer on the first susbtrate 10, and the color filter 12 includes three types of color resins which are of red R, green G and blue B, respectively. The transparent conductive layer 16 is disposed on the black matrix 11 and the color filter 12. The second isolation band 134 is disposed in the peripheral region of the transparent conductive layre, and extending from an edge of the transparent conductive layer to an edge of the color filter substrate. A thickness of the second isolation band 134 is not smaller than a thickness of the transparent conductive layer 16. The second isolation band 134 is provided with a breach, and the inside portion of the transparent conductive layer located inside the isolation band is provided with a fourth extending portion 154, wherein the fourth extending portion 154 is extending to an edge of the color filter susbtrate through the breach.

Optionally, the color filter substrate 1 further includes an insulating planarization layer 14 located on the transparent conductive layer 16. The insulating planarziation layer adopts a transparetn insulating resin material with relatively good insulating performance, and is provided with a convex portion filled in the foruth isolation band 134. The transparent insulating resin material located in the fourth isolation band 134 allows to achieve insulating and anti-static effect in a better way, without reducing the transmittance of the screen. Besides, the fourth isolation groove 134 can also be filled with dry air only, so as to achieve the insulating and anti-static effect.

It can be understood that, the abovementioned embodiments are exemplary implementations adopted to illustrate the principle of the present disclosure, but not limited thereto. For one skilled person in the art, variations and improvements can be devised within the scope and the spirit of the present disclosure, thus the variations and improvements also belong to the scope of the present disclosure.

What is claimed is:

1. A color filter substrate, comprising a conductive layer and a non-conductive black matrix both located at a side of the color filter substrate where a color filter is located, wherein a peripheral region of the conductive layer is provided with an isolation band, the isolation band divides the conductive layer into an inside portion and an outside portion, the isolation band is provided with a breach, the inside portion of the conductive layer located inside the isolation band is provided with an extending portion configured to export static electricity, the extending portion is extending to an edge of the color filter substrate through the breach, wherein the conductive layer is made of a transparent indium tin oxide (ITO) material, and is disposed on the non-conductive black matrix.

2. The color filter substrate according to claim 1, wherein the isolation band is a groove disposed in the peripheral region of the conductive layer.

3. The color filter substrate according to claim 1, wherein the isolation band is extending from an edge of the inside portion of the conductive layer to the edge of the color filter substrate.

4. The color filter substrate according to claim 1, wherein a depth of the isolation band is not smaller than a thickness of the conductive layer.

5. The color filter substrate according to claim 1, further comprising an insulating planarization layer disposed on the conductive layer, wherein the insulating planarization layer is provided with a convex portion filled in the isolation band.

6. The color filter substrate according to claim 1, wherein the isolation band is filled with dry air or filled with a transparent insulating material.

7. The color filter substrate according to claim 1, wherein the isolation band is filled with dry air or filled with a transparent insulating material.

8. A display panel, comprising the color filter substrate according to claim 1 and an array substrate, wherein the array substrate is provided with a grounding portion which is electrically connected to the extending portion.

9. The display panel according to claim 8, wherein the color filter substrate and the array substrate are connected through a sealant, and an outer edge of the sealant is located at an external side of an outer edge of the inside portion of the conductive layer.

10. A display device, comprising the display panel according to claim 8.

11. A color filter substrate, comprising a conductive layer and a non-conductive black matrix both located at a side of the color filter substrate where a color filter is located, wherein a peripheral region of the conductive layer is provided with an isolation band configured to isolate external static electricity, the isolation band is provided with a breach, an inside portion of the conductive layer located inside the isolation band is provided with an extending portion configured to export static electricity, the extending portion is extending to an edge of the color filter substrate through the breach, wherein the color filter substrate further comprises a first substrate on which the non-conductive black matrix and the color filter are disposed, and the conductive layer is made of a transparent indium tin oxide (ITO) material, and is disposed between the first substrate and the non-conductive black matrix.

* * * * *